May 1, 1928.

J. W. FOERCH, JR 1,668,062

CUT-OFF VALVE

Filed Nov. 14, 1925

Inventor
John W. Foerch Jr.
By
Attorney

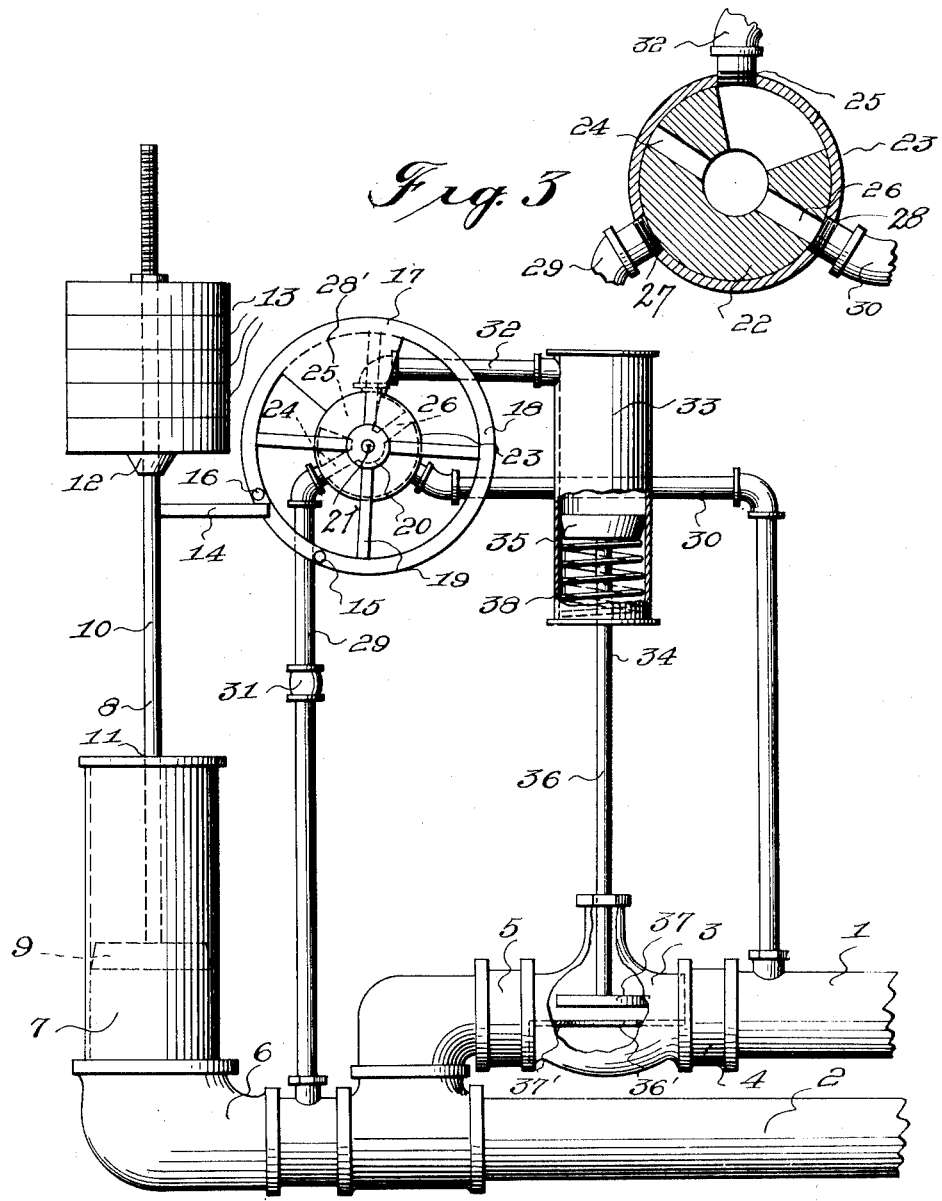

Patented May 1, 1928.

1,668,062

UNITED STATES PATENT OFFICE.

JOHN W. FOERCH, JR., OF WILKES-BARRE, PENNSYLVANIA.

CUT-OFF VALVE.

Application filed November 14, 1925. Serial No. 69,061.

This invention relates to cut off valve, and more particularly to an apparatus of this character designed for cutting off pressure in water or pipe systems in houses and other buildings, although with very slight modifications it may be well adapted for use as a fluid pressure regulator in a broad sense.

The primary object of this invention is to provide an apparatus that will disconnect the house piping in its various ramifications from the "main," except at such times as one or more house pipe outlets is or are opened, as for instance by the opening of one or more faucets in a water system, thus reducing to a minimum the likelihood of leaks or of bursting pipes, etc.

As intimated, the arrangement is such that when the faucet in a water system, or other outlets are closed, the pressure from the "main" or city or town supply is entirely cut off, thus obviating in water systems, leaks at hot water faucets so common in house plumbing systems, due to poor or worn washers, poor connections or otherwise, and in walls where poor connections have been made, all of which cause loss of water, and consequent damage to property. The mechanism is designed to operate practically in an automatic manner as the result of opening or closing the house outlets.

In the drawings illustrating the invention—

Fig. 2 is a similar view partially in section showing substantially the position of parts when an outlet is opened, and communication with the "main" or source of supply is established.

Fig. 3 is a detail section of one of the valves and closely associated parts.

Figure 1:
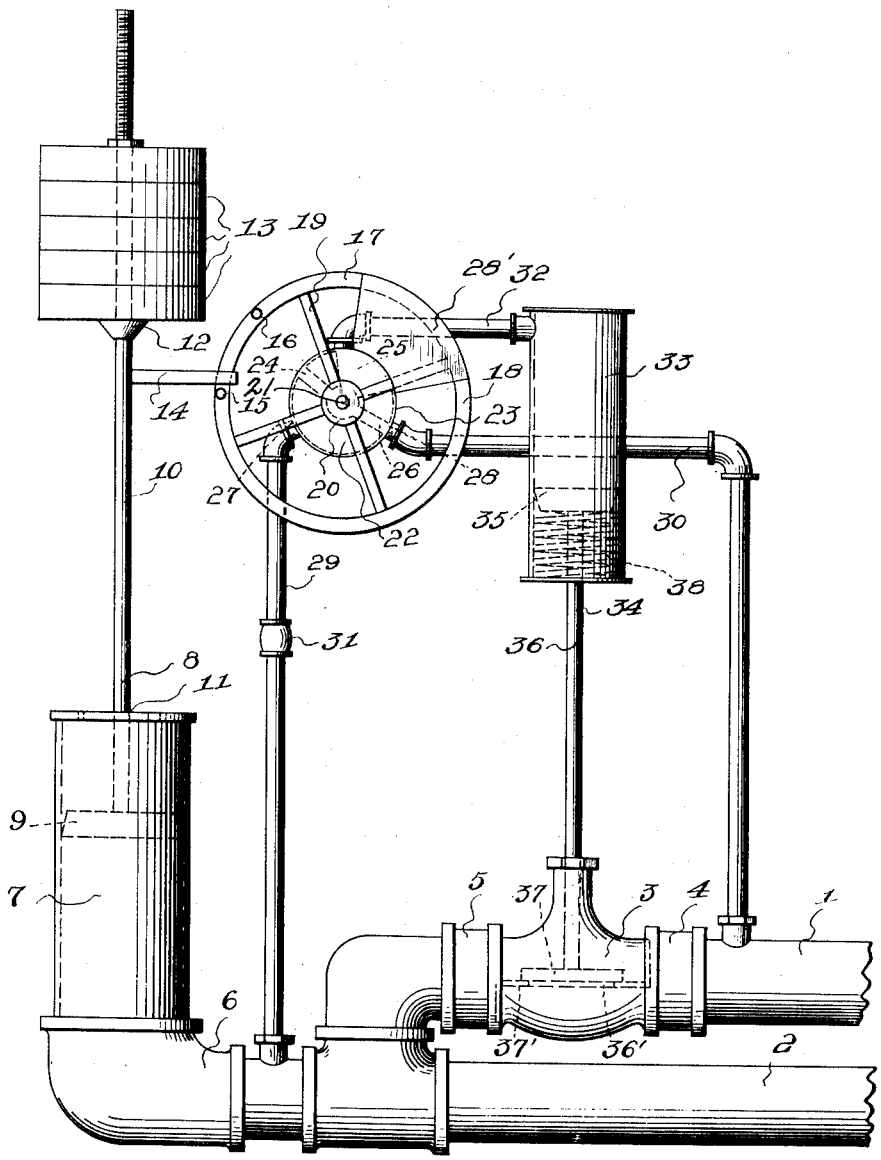
Fig. 1 is a side elevation, the parts being in the positions they occupy when the house outlets and the "main" are closed.

It is understood at the outset that the views illustrating the invention are in a measure diagrammatic or schematic, and only enough of the mechanism is shown to clearly illustrate the salient features of the invention.

Referring to the drawings, the numeral 1 designates the supply pipe leading to the water main, or source of supply, and 2 the pipe to which the various house pipes with their various ramifications are connected.

Interposed between the pipes 1 and 2 is a valve 3 connected to the pipe 1 by a connection 4, and to the pipe 2 by a connection 5, which connections, as is the case with other connections, elbows, couplings, etc. wherever feasible, may be ordinary stock fittings.

Communicating with the pipes 1 and 2 through a suitable coupling 6 is a vented cylinder 7 in which operates a plunger 8 whose head 9 is preferably formed of "cup leather" so that the pressure of the fluid, which in this cylinder is always from the bottom, will cause the periphery of the head to expand against the cylinder wall with a fluid-tight fit.

The plunger rod 10 extends through an opening 11 in the top of the cylinder, and is provided near its upper end with a collar 12 that forms a seat for the lowermost of a number of weights 13, each provided with a hole through which the rod passes. The rod may be threaded for a suitable distance from the top as shown, and a nut may cooperate with the thread and bear upon the uppermost of the weights to keep them all solidly in their place, and at the same time affords means whereby some of the weights may be removed, or additional ones may be added, according to the height of the water pipes in a particular house, which height usually varies with the height of the house or building. The weights are for surely forcing out the water at the highest point, as will presently appear.

The plunger rod 10 is provided below the weights with a laterally extending arm 14 adapted to alternately engage one or the other of two pins 15 and 16 which extend laterally from the rim 17 of a wheel 18. The rim of the wheel is provided with spokes 19 secured to a hub 20, which in turn is connected with a stem 21 of a rotary valve 22 operating in a circular valve casing 23, the valve being a three-way valve, made so by the provision of three channels 24, 25 and 26, two of which, namely, 24 and 26, are adapted to register with ports 27 and 28 in the casing 23. To these ports are connected pipes 29 and 30 between which communication is established at proper times through the channels 24 and 26, as intimated.

The wheel is provided with a weighted sector 28' for a purpose that will presently become obvious. The pipe 29 is connected at its lower end to the pipe 2, and the pipe 30 is similarly connected to the "main" or supply pipe 1. A check valve, indicated by the numeral 31 is provided in the pipe 29 to prevent the movement of the fluid in the direction of the valve.

Communicating with the port 25 of the valve, which port is never closed, is a pipe 32, whose other end is let into the upper end of a closed cylinder 33 in which operates a plunger 34, constituted by a head 35 and a rod 36. The lower end of the rod carries a washer 37, which as now seen, forms a part of the valve 3 in that it is the closing means for the opening 36′ in the web 37′ of the valve, and its movement controls, in part at least, communication between the "main" or supply pipe 1, and the "house" pipe 2.

The pressure of the water in the cylinder 33 forces the plunger downward to seat the washer in the valve 3, and a spring 38 is provided to lift the plunger since the pressure on the head is downward.

I prefer as in the case of the plunger head 9 to make the plunger head 35 of "cup leather" formation to insure a tight fit with the inner periphery of the cylinder. In both cases on account of the cup leather heads, I am enabled to dispense with stuffing boxes for the rods 10 and 36.

It is well known that much annoyance, expense for pipe repairs, and damage to property is caused by leaking pipes and faucets due to the very high pressure from the "main" in all of the house pipes. By cutting off entirely the "main" pressure leaving merely the pressure from the weight of the fluid in the house pipes, or the pressure of the fluid in said pipes, when other than water, there is not enough pressure left to cause leaks or bursting from the pipes.

Operation.

Starting with the parts in substantially the positions shown in Fig. 1, with no house outlet open, and with the valve 3 closed; the plunger head 9 at its highest point, and the plunger head 35 at its lowest point, the operation is substantially as follows:

When the house outlet is opened, the relief at the point of outlet will permit the weights 13 to force the plunger 8 down in the cylinder 7, expelling initially the water from the house pipes through the outlet, when almost immediately, the plunger arm 14 on the rod 10 engages the pin 15 on the wheel rim, causing the wheel to make a partial revolution. This movement causes the weight 28′ to pass over the center of the valve 22 resulting in the instantaneous shifting of the valve. This brings the channel 24 in registry with the port 27 in the valve casing, and at the same time cutting off or closing the port 28, and consequently communication between the pipes 30 and 32, but establishes communication between the pipes 32 and 29. Instantly, the spring 38 will operate upon the plunger head 35 raising it in the cylinder, and thereby, through the rod 36 open the valve 3 establishing communication between the house pipes and the "main," resulting in the usual continued pressure until the house outlet is closed.

Now when the house outlet is closed, the water from the "main" raises the plunger in the cylinder 7, and in so doing, brings the rod 14 in contact with the upper pin 16 on the wheel moving it until the weight 28′ passes the valve center, as before, (except in opposite direction) re-establishing communication between the pipes 30 and 32, through the valve, permitting the fluid from the "main" to pass into the cylinder 33 depressing the plunger head 35 and consequently seating the washer and closing the valve 3.

From the foregoing it will be seen that there is provided a very simple apparatus, not prohibitive to manufacture on account of cost, and one whose action is substantially automatic to accomplish the cutting off from all of the house pipes the "main" pressure, with the consequent advantageous results hereinbefore outlined.

I claim:

1. In a cut off valve of the character described, in combination with a water main, a pipe connecting said main with the house outlets, a normally closed valve for controlling the flow of water from the main through said pipe, a fluid containing cylinder, a weight controlled plunger in said cylinder, said plunger being held normally raised by the water pressure in the main, and adapted to operate to initially expel the fluid through the house outlets, means controlled by said plunger to establish and cut off communication between the house outlet pipe and the water main accordingly as the plunger is raised or lowered.

2. A cut off valve of the character described, in combination with a water main, a pipe connecting said main with the house outlet, a normally closed valve controlling the flow of water from the main through said pipe, a fluid containing cylinder, a plunger in said cylinder, said plunger being held normally raised by the water pressure from the main, means for depressing said plunger when the valve which controls the flow of water from the main is opened, thereby causing the plunger to initially expel the water from the house outlets, said plunger operating means being adapted to be reverted to normal means by the pressure of the water from the main when said valve is closed, and means for opening and closing said valve.

3. In a cut off valve of the character described, in combination with a water main, a pipe connecting said main with the house outlet, a normally closed valve controlling the flow of water from said main to said pipe, a fluid containing cylinder having a normally depressed plunger therein, connections between said plunger and valve whereby movement of fluid in said cylinder will operate to close or open said valve, a second fluid containing cylinder having a weight controlled plunger therein held normally raised by the water pressure from the main and adapted to initially expel the water from the house outlets, a rotary ported valve, connections between said rotary valve and the water main and house outlet connection, and a connection between said valve and the first mentioned cylinder, and means operated upon the movement of said rotary valve to permit the weights to depress the weight controlled plunger, whereby the water is initially expelled from the house outlet.

In testimony whereof I affix my signature.

JOHN W. FOERCH, Jr.